United States Patent [19]

Bertram et al.

[11] 4,135,421

[45] Jan. 23, 1979

[54] QUIET RUNNING CIRCULAR SAW BLADE

[75] Inventors: James T. Bertram, Jasper, Ind.; Steven A. Segal, Atlanta, Ga.; Arthur R. Segal, Jasper, Ind.

[73] Assignee: North American Products Corp., Atlanta, Ga.

[21] Appl. No.: 825,867

[22] Filed: Aug. 19, 1977

[51] Int. Cl.² .............................................. B27B 33/08
[52] U.S. Cl. ........................................ 83/835; 83/852; 83/854
[58] Field of Search ................. 83/835, 837, 852, 854, 83/855, 847, 661, 839; 29/95 B

[56] References Cited

U.S. PATENT DOCUMENTS

| 1,566,880 | 12/1925 | Kelley | 83/852 |
| 3,002,541 | 10/1961 | Wellauer | 83/852 |
| 3,712,348 | 1/1973 | Kulik et al. | 83/835 |
| 3,792,524 | 2/1974 | Pomernacki | 83/854 |
| 3,938,417 | 2/1976 | Nedsten | 83/835 |

Primary Examiner—Donald R. Schran
Attorney, Agent, or Firm—James R. Custin

[57] ABSTRACT

A circular saw blade has block-like tooth tip inserts of hard metal, secured at circumferentially spaced intervals to the peripheral portion of a disc-like blade body having opposite flat side surfaces. The gullet in front of each insert, conventionally present in such a blade, is spanned in the circumferential direction, at least to a substantial extent, by a fixed thin wall, which can comprise a reduced thickness portion of the blade body, so that each gullet is thus defined by a sidewardly and radially outwardly opening cavity in a side surface of the blade, and the blade has a near-circular periphery. At the circumferentially rearward and radially inward portions of each cavity its edges are substantially bevelled to facilitate flow of cuttings out of the cavity.

7 Claims, 10 Drawing Figures

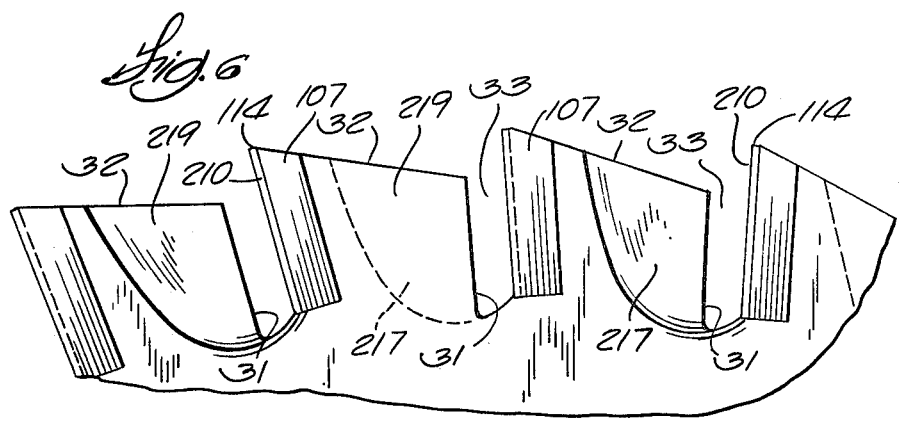
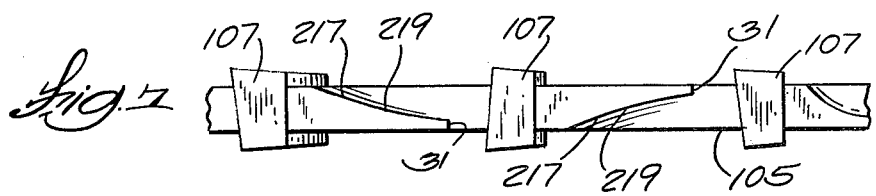
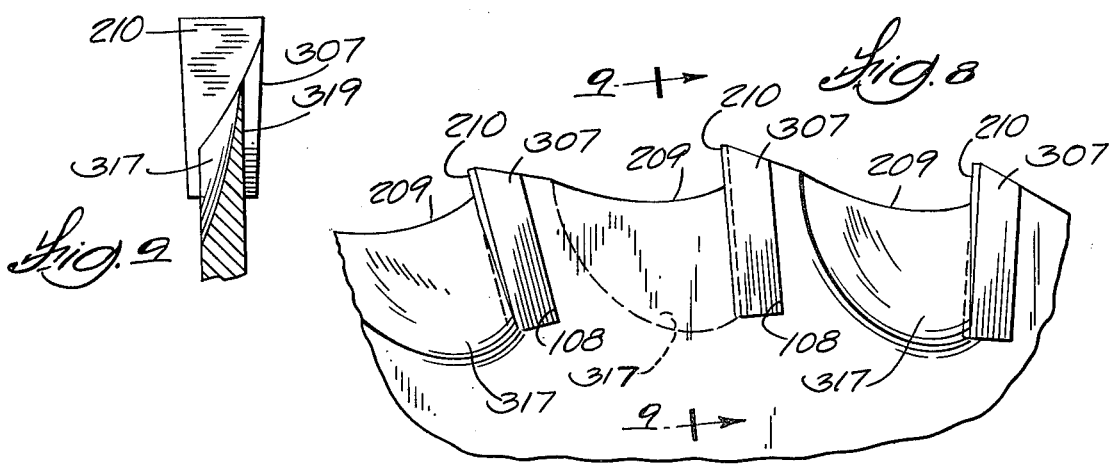
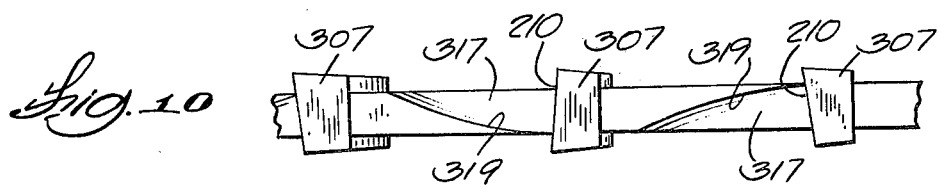

QUIET RUNNING CIRCULAR SAW BLADE

This invention relates to circular saw blades of the type that have their cutting edges defined by hard metal inserts; and the invention is more particularly concerned with a circular saw blade of that type which is very quiet in operation but is nevertheless functionally efficient and very sturdy.

A heretofore conventional circular saw blade intended for cutting wood and similar materials, rotating at its normal operating speed (about 3,600 rpm), is one of the noisiest of all tools. Such a saw blade, in the size range of 14 inches in diameter and upwards, when rotating but not cutting, can have a noise output as high as 90 to 100 dB. A major component of that noise output is in the part of the sound frequency spectrum to which the human ear is most sensitive, namely between about 2,000 and 4,000 Hz. Furthermore, a significant proportion of such saw noise is at frequencies which the ear recognizes as high pitched, and the noise is therefore annoying even to persons at considerable distances from the saw.

Although the noise level of a rotating circular saw blade is higher when it is cutting than when it is idling at its operating speed, its noise output when idling is of major concern, owing to the fact that cutting usually occurs during only a relatively small part of the time that the saw is running. It is believed that prolonged exposure to noise at levels on the order of 90 to 100 dB can cause hearing impairment, although short-period exposures to such noise do not seem to be hazardous. There are many manufacturing plants in which one or more circular saws are required to run continuously, all through the working day, and in such cases the high noise output of an idling circular saw blade is intolerable, even though short intervals of higher level noise, during intermittent cutting operations, would be acceptable in themselves.

Long before recent legislation made noise abatement mandatory, manufacturers and users of circular saw blades had been very much concerned about the inordinate noisiness of such tools. Had there been an obvious solution to the problem, the intense desire for that solution would probably have called it forth before that legislation was enacted, and certainly would have done so afterward. But heretofore it has not been possible to produce a reasonably quiet circular saw blade that would also have satisfactory cutting capability.

A circular saw blade generates noise by reason of its shape, which is primarily determined by its cutting function. In a circular saw blade of heretofore conventional configuration, with deep gullets between its cutting teeth, the gullets are responsible for most of the noise output. As such a saw blade rotates, it imparts a combined radially outward and circumferential flow to the layer of air adjacent to it. The presence of hard metal tooth inserts, the presence of sharply right-angled corners on those inserts and at the junctions of the blade body edge surfaces with its side surfaces, and the irregular shape of the gulleted blade periphery, all cause that air flow to assume a rather complex pattern marked by severe turbulence around radially outer portions of the blade, particularly across the gullets and around the projecting teeth and tooth tips. Such turbulence involves oscillating reversals of air flow which occur at relatively high sonic frequencies, and the blade thus propagates aerodynamic noise as a result of its action upon the ambient air.

The forces exerted upon the air by the tooth portions of the blade produce opposite reactions upon the tooth portions themselves, whereby they tend to be set into vibration. Becuase of the resilience that characterizes a good circular saw blade, the vibrations of the teeth can be transmitted radially inwardly to the central part of the blade body and tend to vibrate it flatwise, like the cone of a loud speaker. Unless vibration of the blade body is effectively prevented, noise in addition to aerodynamic noise can be propagated by piston action of the blade body itself, which acts as a fairly efficient dipole radiator.

It has been proposed that circular saw blades be made with sandwiched laminations of vibration damping material, or with teeth having root portions so configured as to minimize transmission of tooth vibrations into the blade body. It will be apparent that blades embodying these proposals will at best afford only small improvements in noise output because they will still incorporate the mechanism for aerodynamic noise generation. This is to say that an effective attack on the problem of circular saw noise must involve the basic configuration of the blade.

It has recently come to be appreciated that the gullets between the blade teeth are a principal cause of aerodynamic blade noise. But it has always been considered necessary that there be a gullet that opens in front of and radially inwardly from each cutting edge on a blade, to provide a space in which chips can move away from the cutting edge of the tooth as they are cut away from the workpiece. Furthermore, the gullet must be of adequate size to accommodate the substantial flow of chips that develops at high cutting feed rates, and it should be of such shape as to encourage chips to move away from the cutting edge in a direction radially inwardly relative to the blade. Because of this need for gullets between teeth, there seemed to be little or no prospect of materially reducing saw blade noise by changing the configuration of the saw blade.

It is worthy of mention that a certain amount of aerodynamic noise generation is due to the block-like hard metal tooth tip inserts conventionally provided on circular saw blades intended for heavy duty use. Such inserts usually have a width somewhat greater than the thickness of the blade body, and their flat sides and sharp-cornered edges naturally aggravate the turbulence produced by the conventional gullets adjacent to them. Again, the configuration of tooth tip inserts is largely controlled by functional considerations and is subject to little or no modification that would materially reduce the noise output of a heretofore conventional blade.

In general, therefore, the art has heretofore had no choice but to accept extremely high noise levels in circular saw blades of the type here under consideration, for the only alternative seemed to be a blade that would not cut satisfactorily.

The general object of the present invention is to resolve this dilemma by providing a circular saw blade which has adequate gullets for carrying chips away from its cutting edges, so that the blade is functionally satisfactory, but which nevertheless has a nearly unbrokenly periphery so that the aerodynamic noise output of the blade is extremely low.

Another general object of the invention is to provide a circular saw blade of the type having tooth tip inserts, which blade has a low level of aerodynamic noise output and also has little or no tendency to be set into vibration by its reactions to such aerodynamic forces as it produces, so that it is extraordinarily quiet when idling, even when installed on a sawing machine that does not confine the blade body against vibration.

A more specific object of the invention is to provide a circular saw blade so configured that its periphery has only small departures from true circularity, but which nevertheless has tooth tip inserts that provide the cutting edges on the blade and has a gullet ahead of each tooth tip insert, such gullet being in the form of a cavity in a side surface of the blade body, into which chips or cuttings can move and which thus performs the function of a heretofore conventional gullet that opened through the blade body.

It is also a specific object of this invention to provide a circular saw blade having blocklike hard metal inserts that provide the cutting edges on the blade, wherein the inserts are arranged to produce a minimum of air turbulence and wherein advantage is taken of the fact that the inserts project beyond the opposite side faces of the blade body to enable the blade to have a minimum of peripheral irregularity.

It is also an object of this invention to provide a circular saw blade having hard metal tooth tip inserts that is remarkably quiet in operation but is nevertheless as sturdy as any comparable blade of heretofore conventional type and equally efficient in its cutting action.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate several complete examples of embodiments of the invention constructed according to the best modes so far devised for the practical application of the principles thereof, and in which:

FIG. 6 is a side view of a part of another modified embodiment of a saw blade according to the principles of this invention;

FIG. 7 is an edge view of the saw blade shown in FIG. 6;

FIG. 8 is a side view of a portion of still another modified embodiment of a blade of this invention;

FIG. 9 is a fragmentary view in section taken on the plane of the line 9—9 in FIG. 8; and FIG. 10 is an edge view of the saw blade shown in FIG. 8.

Figure 1:
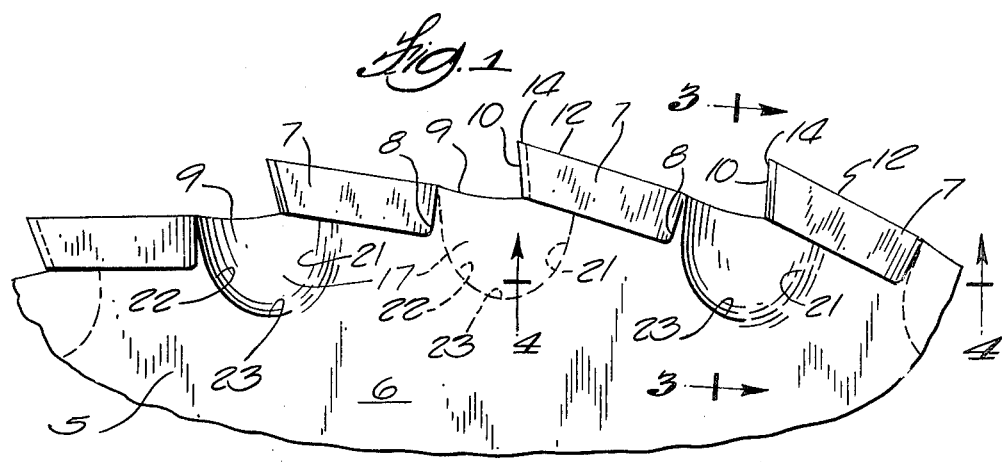
FIG. 1 is a side view of a portion of a circular saw blade embodying the principles of this invention.

Referring now to the accompanying drawings, the numeral 5 designates generally the disc-like body of a circular saw blade embodying the principles of this invention, made of tough, resilient steel and having opposite substantially flat side surfaces 6. The teeth and cutting edges on the blade are defined by block-like hard metal inserts 7 that are brazed or otherwise secured to the peripheral portion of the blade body 5 at circumferentially spaced intervals around it.

As is conventional, the inserts 7 are elongated, substantially rectangular blocks of a metal such as tungsten carbide. In the embodiments of the invention illustrated in FIGS. 1–5, the longer dimension of each block-like insert 7 extends substantially circumferentially, so that each insert presents a minimum of frontal area in the direction of blade rotation. Each insert 7 is seated in a more or less V-shaped notch 8 in the periphery of the blade body, and except for these notches, the edge of the blade body 5 can be substantially circular.

Each insert 7 has a front face 10 that faces in a forward substantially circumferential direction, that is, in the direction of rotation intended for the blade. A substantially flat radially outer face 12 on the insert meets its front face 10 at a sharp corner which defines a cutting edge 14.

The notch in which each insert is seated so orients the insert in relation to the blade periphery that the radially outer face 12 of the insert extends obliquely radially inwardly and circumferentially, to provide rearward relief. Thus, at the rear of the insert its radially outer face is at a smaller distance from the blade axis than its cutting edge 14. Preferably the edge portion 9 of the body that extends between each pair of circumferentially adjacent inserts lies on a substantially straight, continuous line with the radially outer face 12 of the insert immediately ahead of it, rather than being arcuate and concentric to the blade axis.

The front face 10 of each insert can be dressed to a suitable rake angle in accordance with known practice, and can also have a side bevel as explained hereinafter. The faces 10 and 12 that define the cutting edges 14 can be dressed after the inserts are secured to the blade body, and the whole of each front face is accessible for such dressing because it projects radially outwardly from the blade body periphery. As is also conventional, the width of each insert, as measured parallel to the blade axis, is somewhat greater than the thickness of the blade body 5, but the insert tapers slightly in width in the rearward circumferential direction to provide so-called back clearance. Each insert can also have some taper in width in the radially inward direction.

It will not have escaped attention that the blade of this invention lacks the conventional bay-like gullets which impart a markedly irregular outline to the periphery of prior circular saw blades, and that, instead, the present blade has an almost perfectly circular outline, interrupted mainly by the rather small jogs presented by the front faces 10 of the inserts. Of course the radially shallow space directly in front of each insert is not big enough to accommodate all of the cuttings removed from a workpiece as the cutting edge 14 makes a cutting pass across it, and some form of gullet is essential to provide a space into which the cuttings can flow away from the cutting edge and in which they can be carried through and out of a kerf being cut by the blade. In accordance with this invention, the blade has gullets, but each gullet is closed at one side of the blade and thus comprises a cavity 17 in the opposite side surface of the body, opening axially outwardly, and also radially to the periphery of the blade, and having a depth that is preferably in excess of half of the thickness of the body. The gullet cavities 17 can be readily formed in the blade body by a grinding operation performed before the tooth tip inserts 7 are attached to the body.

Figure 3:
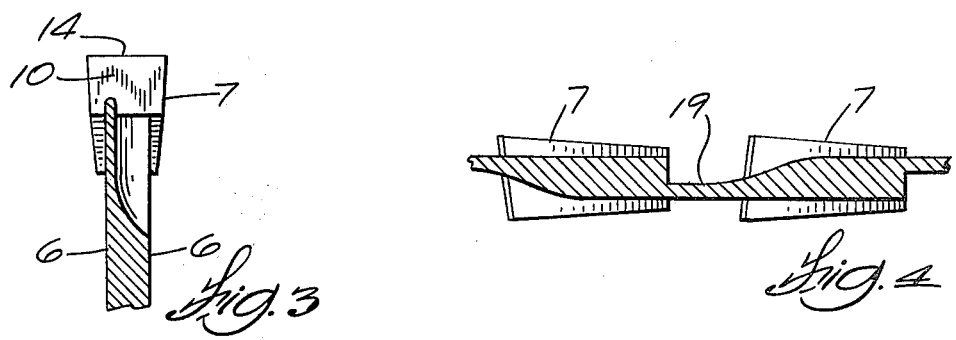
FIG. 3 is a view in section through the blade, taken on the plane of the line 3—3 in FIG. 1.

Considering the blade in side view, the edge outline of each cavity 17 corresponds substantially to the shape of a conventional gullet, and it is from that standpoint that gullets can be said to be present in the blade of this invention. The closure for each closed gullet is a thin wall 19 that comprises a portion of the blade body which is of substantially reduced thickness and which extends across the gullet in the circumferential direction. Since each of those reduced thickness portions of the blade body has a radially outer edge 9 that lies on, or close to, a circle concentric with the blade axis, the blade body has the nearly circular outline already mentioned and it therefore generates a minimum of air turbulence because the thin walls 19 that edgewise span the gullets block air flow across the thickness of the blade. Preferably the wall 19 is rounded in cross section at its radially outer edge, as shown in FIG. 3.

The cavities 17, as seen from the sides of the blade, are shaped in outline substantially like conventional gullets. Each cavity has a circumferentially rear edge 21 that extends substantially radially inwardly from its associated insert at or behind the front face 10 thereof, a front edge 22 that extends substantially radially inwardly from the body periphery at some distance ahead of that front face, and a concavely rounded or arcuate edge portion 23 that defines the radially innermost portion of the cavity. However, the radially inner edge portion 23 of the cavity and its rear edge portion 21, along much of the length of the latter, are not well defined inasmuch as the cavity, at its radially inner portion, has a tapering diminution in depth towards those edges. "Depth," as used herein, means depth as measured axially inwardly from the plane of a flat side surface of the blade body.

Considering the cavity as defined by the reduced thickness portion 19 of the blade body, that portion of the body is thickened rearwardly and radially inwardly at the radially inner portion of the cavity, to merge rather gradually into the substantially flat side surface proper of the blade body; or, if the cavity 17 is considered as a closed gullet, it can be said that the circumferentially and radially innermost edge portions of that gullet are substantially beveled. By reason of these beveled edge portions, chips and cuttings that enter the cavity can readily flow out of it in a radially inward and circumferentially rearward direction, to enter the space between the flat side surface of the blade body and the opposing side surface of a kerf being cut by the blade. The last mentioned space exists by reason of the fact that the width of the tooth inserts is greater than the thickness of the blade body.

Inasmuch as the reduced thickness portion 19 of the blade body is of minimum thickness adjacent to the peripheral edge of the body, as well as for some distance radially inwardly therefrom, the cavity 17 defined by this reduced thickness body portion can be said to open radially outwardly as well as in one axial direction.

Figure 2:
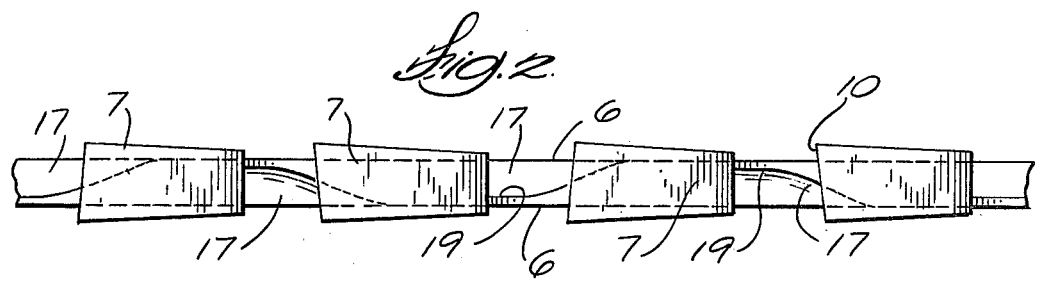
FIG. 2 is an edge view of the blade shown in FIG. 1.
Figure 4:
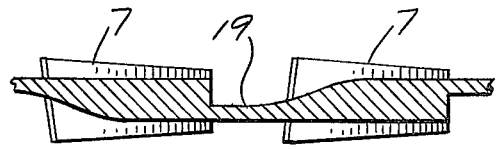
FIG. 4 is a view in section, taken on the plane of the line 4—4 in FIG. 1.

The front face 10 of each tooth tip insert is inclined across its width to slant circumferentially rearwardly and towards the side of the blade to which its cavity 17 opens, so that cuttings are propelled laterally towards the cavity by the inclined tooth tip surface. Such so-called face bevel on the front faces of tooth tip inserts is conventional. Usually successive teeth around the circumference of a saw blade have opposite face bevels, as illustrated in FIGS. 2 and 4, and in such cases circumferentially adjacent cavities are at opposite sides of the blade body, and the side surface of the body that is opposite each cavity is uninterruptedly flat.

Figure 5:
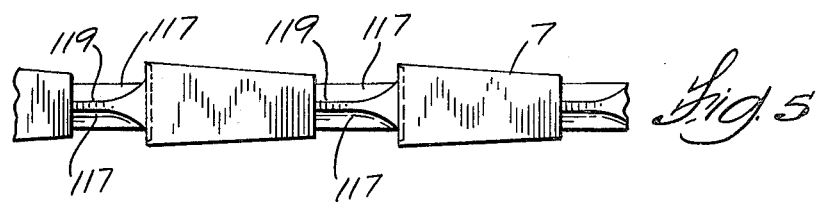
FIG. 5 is an edge view of a portion of a modified embodiment of the circular saw blade of this invention.

In some tooth arrangements, certain of the tooth tips, or all of them, have no face bevel. FIG. 5 illustrates such an arrangement. In that case, two gullet cavities 117 of this invention are associated with each unbeveled tooth, one at each side of the blade. Cuttings can then flow into either such cavity or into both of them. Each such gullet cavity has a maximum depth equal to somewhat less than half the thickness of the blade body, so that the reduced thickness blade body portion 119 which closes or spans the gullet provided by those cavities is in the nature of a thin septum between them. As in the previously described embodiment of the invention, the radially inner portions of the cavities diminish gradually in depth circumferentially rearwardly and radially inwardly; or, in other words, the cavities have markedly beveled rear and radially inner edge portions.

It will be evident that a saw blade embodying the principles of this invention will perform most satisfactorily or workpieces that tend to yield chips or cuttings which are relatively small. On particle board, hard woods and thin-walled workpieces of soft metal, the saw blade of this invention can cut at feed rates comparable to those obtained with a blade having gullets of the heretofore conventional type. With soft, gummy woods there is some tendency towards loading of the gullet cavities, although it may be possible to cut such woods at reduced feet rates.

The very low aerodynamic noise output of the saw blade of this invention would justify accepting some sacrifice in production rate on those materials for which it is not well suited. By way of specific example, tests were made on a circular saw blade having heretofore conventional gullets that were specifically designed for low noise output. With that blade mounted on a table saw machine, rotating at operating speed but not cutting, noise level measurements were taken at four different locations around the machine and near it. Noise measurements at the four locations varied from 75 dB to 83 dB and averaged about 80 dB. When a corresponding blade embodying the principles of this invention was placed on the same macine, measurements taken at the same four locations varied from 72 dB to 79 dB and averaged 75 dB.

At first glance a 5 dB reduction in noise level may not seem large, but because decibel values vary logarithmically, these test measurements in fact signify that the perceptible noise output of the blade of this invention was about half that of the conventionally-gulleted blade used in the test, which was an unusually quiet one.

No measurements were taken of noise values in discrete frequency bands, but it was observed that the noise output from the blade of this invention was more nearly a "white noise" — that is, it seemed to be fairly uniformly distributed through the audible frequency spectrum — in contrast to the high-pitched and annoying whine or scream that has previously characterized the running of circular saw blades.

Since the blades subjected to these tests had their bodies rigidly supported, the tests essentially measured aerodynamic noise. But it will be obvious that the blade of this invention will bring about a marked improvement in the noise level of a sawing machine in which the blade is so mounted as to be capable of some degree of axial vibration. The small radially projecting teeth in the blade of the present invention, defined by the tooth tip inserts 7, are rather rigidly connected with one another and with the blade body, so that the blade body has little or no tendency to be set into vibration by aerodynamic reaction and to act as a sound radiator, even when it is mounted in a manner that would favor its doing so.

In the modified embodiment of the invention illustrated in FIGS. 6 and 7, the insert blocks 107 that define the cutting edges 114 of the blade are oriented with their longer dimensions extending substantially radially relative to the body 105 of the blade. In front of each insert the blade has a gullet which is closed and spanned to a reduced extent by a reduced thickness portion 219 of the blade body, as in the previously described embodiments of the invention; but in this case that thin portion of the body terminates a distance short of the insert to have a radially extending rear edge 31 as well as a radially outermost edge 32. The rear edge 31 is in spaced, substantially parallel relation to the front face 210 of the insert, to cooperate with it in defining a circumferentially narrow slot 33 which opens through the body and which permits the front face of the insert to be accessible to a grinding wheel for dressing and sharpening. Because the slot 33 is narrow in the circumferential direction, it does not have a markedly adverse effect upon the noise output of the blade.

It will be apparent that the reduced thickness portion 219 of the body that is ahead of each insert defines a cavity 217 in one side surface of the blade, as in the previously described embodiments of the invention. In this case, too, the cavity has a gradual radial inward diminution in depth at its radially inner portion.

The embodiment of the invention illustrated in FIGS. 8–10 is essentially like that of FIGS. 1–4, but its blocklike tooth tip inserts 307 are secured in radially deep slots 108 that open to the blade body periphery, and each insert has its longest dimension oriented substantially radially, this being the more usual orientation of tooth tip inserts in circular saw blades. Each insert is thus securely locked to the blade body by reason of the fact that it is substantially embraced by the blade body and has only a small tip portion projecting beyond the blade body periphery.

In this case the closed gullets or gullet cavities 317 can be formed in the body after the tooth tip inserts are installed therein and simultaneously with the dressing of the front face 210 of each tooth insert. For such dressing, each insert can be engaged by a flat side face of a grinding wheel (not shown) while a profiled periphery on the grinding wheel engages the blade body just ahead of the insert to form the cavity or closed gullet 317, which is concavely hollowed to be more or less scoop shaped, increasing in dept radially outwardly all the way to the periphery of the body. Thus the reduced thickness portion 319 of the body that circumferentially spans and closes each gullet tapers all along its radial dimension, to be reduced to a virtual knife edge at the periphery of the blade.

Each tooth insert is of course so dressed as to provide it with a face bevel that will sweep cuttings towards the side of the blade at which its forwardly adjacent gullet cavity is located, and, again, circumferentially adjacent tooth inserts have oppositely inclined face bevels.

Because of the manner in which the gullet cavities are formed, and the scoop-like concavity of each, the peripheral edge 209 of the reduced-thickness body portion that spans each gullet is concavely arcuate, and the blade outline departs to a greater extent from circular roundness than does the blade of FIGS. 1–5. The periphery of the blade is nevertheless much more nearly circular than it would be if the blade body had equivalent open gullets, and there are no substantial abrupt discontinuities on the edge of the blade to induce severe turbulence.

From the foregoing description taken with the accompanying drawings it will be apparent that this invention provides a circular saw blade which is capable of cutting many kinds of wood and non-ferrous metals at feed rates as high as those of the best heretofore conventional blades, but which is unusually quiet in operation and, specifically, has a noise output in its idling condition that is well within levels acceptable for continuous exposure without likelihood of hearing injury.

Those skilled in the art will appreciate that the invention can be embodied in forms other than as herein disclosed for purposes of illustration.

The invention is defined by the following claims:

1. A circular saw blade of the type having teeth at circumferentially spaced intervals on the peripheral portion of a disc-like body that has axially oppositely facing substantially flat side surfaces, each of said teeth having a front face which faces in a forward substantially circumferential direction and extends across at least a major portion of the thickness of the body and having a radially outer face that intersects said front face at a cutting edge, and said body having a gullet for each tooth, the major portion of said gullet being circumferentially forward of said front face and said gullet extending a substantial distance radially inwardly from said cutting edge, said saw blade being characterized by:

A. each gullet being spanned, at least in substantial part in the circumferential direction, by a reduced thickness portion of the body which cooperates with circumferentially adjacent portions of the body to provide the blade with a near-circular periphery, but there being a portion of each tooth, having said front face thereon, which projects radially beyond its forwardly adjacent reduced thickness portion of the body, the gullet thus having the form of a cavity in a side surface of the body which has its full depth at the periphery of the body; and B. each of said cavities having its radially inner portion gradually diminished in depth radially inwardly and circumferentially rearwardly, so that chips which enter the cavity at the periphery of the blade can readily flow radially inwardly and circumferentially rearwardly out of the cavity.

2. The circular saw blade of claim 1 wherein certain of said teeth have a face bevel towards one of said side surfaces of the body and certain other of said teeth have a face bevel towards the other of said side surfaces, further characterized by:

the reduced thickness portion of the body that is circumferentially forwardly adjacent to each of said teeth being so disposed across the thickness of the body that the cavity defined thereby opens to the side surface of the body towards which the face bevel of said tooth is inclined, the other side surface of the body being substantially flat across the circumferential interval between said tooth and the one forwardly adjacent to it.

3. The circular saw blade of claim 1 wherein certain of said teeth have no face bevel, further characterized by:

the reduced thickness portion of the body that is circumferentially forwardly adjacent to each of said certain teeth being substantially in a plane intermediate said side surfaces of the body so as to define a pair of opposite cavities, one in each of said side surfaces.

4. The circular saw blade of claim 1 wherein said front face and said radially outer face on each tooth are formed on a block-like tooth tip insert secured to the body, wherein each of said tooth tip inserts is secured to the body with its longest dimension oriented substantially circumferentially, and wherein each of said reduced thickness portions of the body extends circumferentially through substantially the entire distance between circumferentially adjacent tooth tip inserts.

5. The circular saw blade of claim 1 wherein said front face and said radially outer face on each tooth are formed on a block-like tooth tip insert secured to the body, wherein each of said tooth tip inserts is secured to the body with its longest dimension oriented substantially radially, and wherein each of said reduced thickness portions of the body has a circumferentially rear edge which is spaced from and substantially parallel to the front face of an adjacent tooth tip insert to cooperate therewith in defining a circumferentially narrow slot through the body that opens to the periphery of the blade.

6. A circular saw blade of the type comprising tooth tip inserts secured at circumferentially spaced intervals to the peripheral portion of a disc-like body that has axially oppositely facing side surfaces, each of said inserts having a front face which faces in a forward substantially circumferentially direction and a radially outer face which meets its front face at a sharp cutting edge, each insert having a width to project sidewardly beyond a side surface of the body and to extend across at least a substantial part of the thickness of the body, and said body having a gullet for each insert, the major portion of which is circumferentially forward of the front face of the insert and which extends a substantial distance radially inwardly from said cutting edge on the insert, said saw blade being characterized by:

A. the blade having a near-circular periphery, to the extent that the greatest departures from a uniform peripheral radius are at the front faces of the inserts;

B. each gullet being defined by a cavity in said side surface of the body that extends to the periphery of the body and a distance radially inwardly therefrom and has its greatest depth at the periphery of the body; and C. the depth of each cavity at its radially innermost portion being taperingly diminished radially inwardly and circumferentially rearwardly.

7. In a circular saw blade of the type having a disc-like body with opposite substantially flat side surfaces and having teeth on the peripheral portion of the body at circumferentially spaced intervals around the same, each of said teeth having a front face that faces in a forward circumferential direction and extends across at least a major portion of the thickness of the body and having a radially outer face which meets its front face at a cutting edge, and said body having a gullet for each of said teeth, the major portion of said gullet being circumferentially forward of said front face and said gullet extending a substantial distance radially inwardly from said cutting edge:

A. means for minimizing noise producing turbulence due to air flow through the gullets from one side of the body to the other, said means comprising a wall portion fixed to the body but substantially thinner than the remainder of the body, extending edgewise circumferentially across at least a major portion of each gullet and having a radially outer edge beyond which said front face of the rearwardly adjacent tooth projects radially, so that such projections constitute the major departures from circularity of the body periphery; and B. each gullet being substantially beveled at its circumferentially rearmost and radially innermost portions so that said portions of the gullet merge into a flat side surface of the body and facilitate flow of chips out of the gullet in a rearward and radially inward direction.

* * * * *